Nov. 6, 1951 R. W. PASHBY 2,574,411
DETACHABLE HANDLE FOR STEAK PLATTERS AND THE LIKE
Filed Feb. 15, 1946
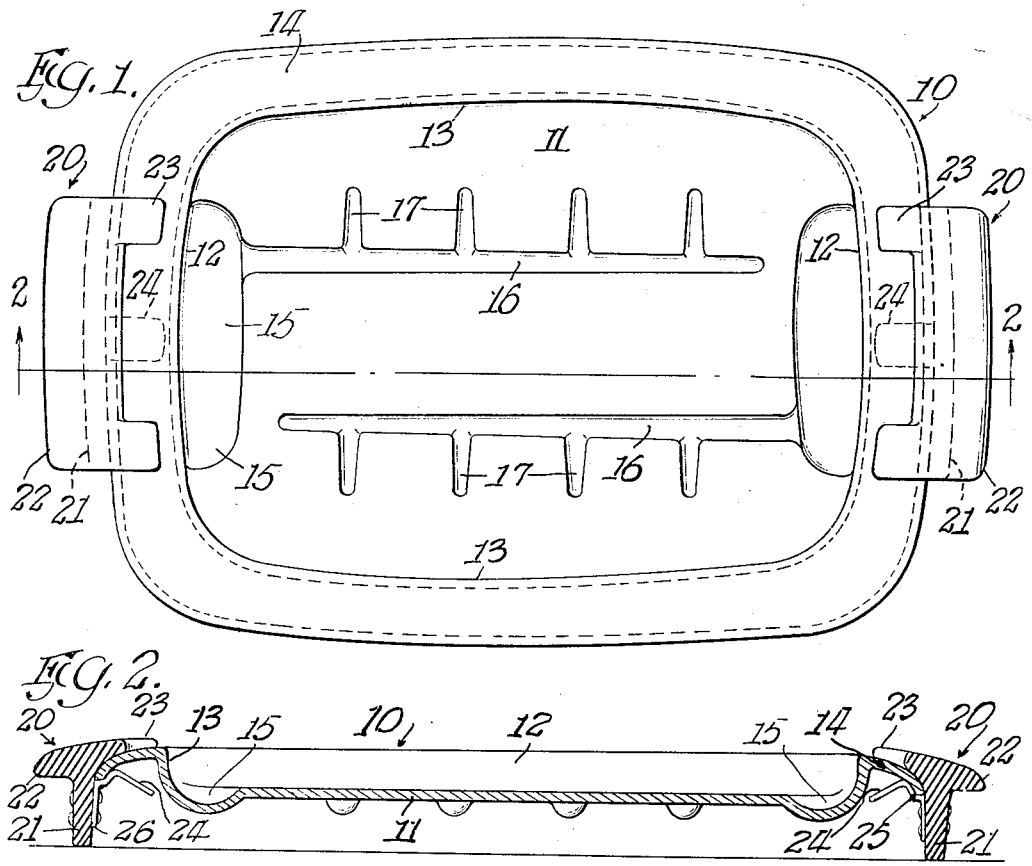
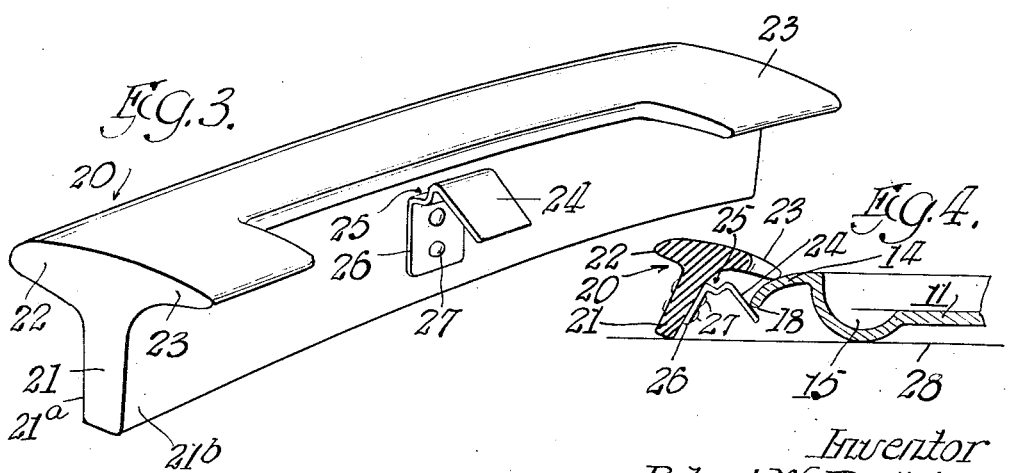
Inventor
Robert W. Pashby Patented Nov. 6, 1951

2,574,411

UNITED STATES PATENT OFFICE 2,574,411

DETACHABLE HANDLE FOR STEAK PLATTERS AND THE LIKE

Robert W. Pashby, Park Ridge, Ill., assignor to Club Aluminum Products Co., Chicago, Ill., a corporation of Delaware Application February 15, 1946, Serial No. 647,817

4 Claims. (Cl. 16—114)

This invention relates to improvements in detachable handles for steak platters and the like, and it consists of the matters hereinafter described and more particularly pointed out in the appended claims.

One of the objects of the present invention is to provide carrying and supporting handles that may be readily but detachably applied to opposed portions of the rim flange of a hot steak platter or the like, when the latter is resting upon a surface such as the hot floor of a broiling oven.

Another object of the invention is to provide carrying and supporting handles which are so formed that when detachably engaged with opposed flange portions of a hot platter, function with a lever action to firmly clamp said flange portions in a manner affording safety against accidental detachment of the handles from the hot platter while being carried by means of said handles.

A further object of the invention is to provide detachable handles for a platter or the like, which are so constructed as to prevent the fingers of the hand from contacting and being burned by the hot platter, while applying the handles thereto or when carrying said hot platter.

Again, it is an object of the invention to provide detachable handles which, in their application to the flange of the platter, lifts and then supports the same in an elevated position above a table surface upon which it may be placed so that an air space is afforded between the bottom of the hot platter and said surface.

The above mentioned objects of the invention, as well as the advantages thereof will more fully appear as the specification proceeds.

In the drawings:

Fig. 1 is a top plan view of a pair of the improved handles when detachably applied or connected to opposite parts of the marginal rim flange of a steak platter or the like.

Fig. 2 is a longitudinal vertical sectional view through the platter and the handles appearing in Fig. 1, as taken on the line 2—2 thereof and more particularly illustrates how the handles support the platter with its bottom position elevated above a table surface or the like to provide an air space therebetween.

Fig. 3 is a perspective view of the handle on a scale enlarged over that of Figs. 1 and 2 as the same appears when viewed from that side associated more directly with the marginal flange of a platter or the like.

Fig. 4 is a detail fragmentary view of parts at the left hand end of Fig. 2 and more particularly shows the position of one of the handles in the initial step of its application to the flange of the platter.

Referring now in detail to that embodiment of the invention illustrated in the drawings and more particularly to Figs. 1 and 2 thereof, the platter, which is indicated as a whole by the numeral 10, includes an elongated generally rectangular shallow dish-like body having a substantially flat bottom 11 and upright sides and ends 12 and 13, which terminate in an outwardly and downwardly curved marginal flange 14 extending entirely about the top of the body. In each end of the bottom 11 is a gravy well 15 and into each of which drains an associated gravy groove 16 and the lateral branches 17 thereof. The bottom of said wells and grooves project below the under surface of the bottom and act as supporting feet therefor when the platter itself is engaged upon a supporting surface. The edge 18 (see Fig. 4) of the flange 14 is disposed in a horizontal plane between the top edge of the walls 12 and 13 and the bottom surfaces of the wells 15 and grooves 16 and branches 17 thereof. The platter above described is preferably a metal casting of substantial thickness so as to withstand and retain relatively high temperatures to which it is subjected as when broiling a steak, chop or the like thereon for future serving, while hot, at a dining table.

20 indicates as a whole one of a pair of counterpart handles adapted to be detachably connected to opposed portions of the flange 14 as will later appear and which best appears in Fig. 3. Preferably the body thereof is made from suitable heat insulating material of the molded plastic type. The handle, which is of a substantially T shaped cross section, may be said to be elongated as it is longer than it is high or wide. It includes a generally upright body 21 of an overall vertical height greater than the vertical depth of the platter and projecting outwardly from the outer face 21a thereof and extending the full length of the top of the body is a finger graspable flange-like portion 22. Projecting outwardly from the other face 21b of the top of the body is a flange-like portion 23, which is curved on its under side to have an overhanging engagement with the curved top surface of the platter flange 14 when the handle is attached or applied thereto as in Fig. 2. Preferably, but not necessarily so, a part of the mid portion of this flange is removed, thus leaving only the end portions of the flange intact as best appears in Fig. 3.

Centrally of the ends of the face 21b of the body, and below the removed part of the flange 23, is a means which provides a downwardly and outwardly inclined surface 24 which terminates at the top where it joins the surface 21b as an upwardly facing recess 25. Preferably the means providing said surface and recess is in the form of a metallic clip that includes a tongue-like body 26 that is secured to the face 21b of the body by rivets or the like 27 that pass through the body 21.

Assume that a steak or the like has been broiled upon the platter 10 and which platter has been removed from the oven and rests on a flat surface, as indicated by the line 28 in Fig. 4. Such a platter, of course, will be quite hot. Now, assume that it is desired to carry the hot platter, with the steak thereon, to a dining table or the like for serving. It is preferred that both handles be applied simultaneously to those parts of the flange 14 at opposite ends of the platter in the following manner. Grasping the portion 22 of both handles by means of the fingers of both hands, said handles are tilted inwardly at the top while the bottom edges of the bodies 21 engage upon said surface 28. This disposes the lower end edges of the clip surfaces 24—24 at an elevation below that of the edge 18 of the flange 14. Both handles are then moved laterally inwardly toward their associated flange portions until the surfaces 24 engage the edges of the associated flange portions, as appears in Fig. 4. At this time, the edges of the parts 23—23 will substantially engage the top surface of said flange portions.

With the fingers grasping the portion 20 of both handles, the bottom portion of the bodies of the handles are pushed inwardly so that the upper ends of the bodies are tilted or rocked outwardly. In this movement of the handles, the clips function as lever arms to impart a lift to the associated flange portions, the edges of which slide along of said surfaces 24 into the recesses 25—25 as the portions 23—23 swing away from their associated parts of the surface of the flange 14. This elevates the platter into a position spacing the bottom surface thereof above the surface 28. The inner upper portions of both handles are then swung inwardly and downwardly so that the underside of the handle portions 23—23 engage the top surface of the flange, as appears in Fig. 2. It will be noted that in applying the handle, as above described, the bodies thereof prevent the fingers that are grasping the portions 22—22 thereof from engaging any part of the hot platter.

With the portions 22 of both handles still grasped, as mentioned, the hot platter may now be carried by the handles and then be placed upon a dining table for service. When the platter is thus being carried, it will be noted that its weight will cause the handles to swing or rock about the flange edge portions 18 engaged in the recesses of the handle, thus causing the handle portions to more firmly press downwardly upon the top surface of the associated flange portions so that the handles and platter are locked together as an integral structure in a manner preventing separation between the platter and handles while carrying the platter by means of the handles.

When the platter is set down upon the surface of a dining table, the bottom edges of the bodies 21—21 of both handles engage flatwise upon the said surface, with the bodies of both handles standing upright, as in Fig. 2. In this condition the bottom of the platter is spaced above said surface to provide an air space which prevents marring or checking of said surface by reason of the heat from said platter bottom. It is to be noted that with the parts arranged as described, the weight of the platter, through the lever action before mentioned, securely locks the handles to the platter.

When the platter has cooled down and it is desired to remove or detach the handles from the platter, the platter is grasped at its opposite sides and lifted upwardly and the handles will then drop off said flanges.

The handles are of simple construction, are easily applied to the platter in a manner preventing a burning of the fingers and when applied assures safety because they guard against accidental separation between the platter and handles when the platter is being carried by said handles. Also the handles may be separated from the cooled platter merely by lifting the platter upwardly.

While in describing the invention I have referred in detail to the form, arrangement and construction of the parts involved, this is to be considered only in the illustrative sense so that I do not wish to be limited thereto except as may be specifically set forth in the appended claims.

I claim as my invention:

1. A handle for the purpose described and embodying therein a body having generally upright outer and inner sides, finger graspable means projecting from the outer side of the body, means projecting from the inner side of the body and having a bottom surface that inclines upwardly from said inner side of the body, a member on the inner side of the body below the last mentioned means and providing an upwardly opening recess and including a portion having a surface inclined downwardly and outwardly from the upper end of said recess.

2. A handle for the purpose described and embodying therein a body having generally upright outer and inner sides, a finger graspable flange-like portion projecting from and extending longitudinally of the outer side of the body, flange-like portions projecting from the upper part of the inner side of the body and having an upwardly inclined bottom surface, a member on the inner side of the body below said flange-like portions and providing an upwardly opening recess and including a portion having a surface inclined downwardly and outwardly from the upper end of said recess.

3. A handle for the purpose described and embodying therein a body having generally upright outer and inner sides, finger graspable means projecting from the outer side of the body, means projecting from the inner side of the body and having an upwardly inclined bottom surface, a member on the inner side of the body below the last mentioned means and having an offset part coacting with said inner side of the body in forming an upwardly opening recess and including a portion having a surface inclined downwardly and outwardly from the open end of said recess.

4. A handle for the purpose described and embodying therein an elongated body of insulating material having generally upright outer and inner sides, finger graspable means integral with the body and projecting from the outer side thereof, other means integral with the body and projecting from the inner side thereof and having an upwardly inclined bottom surface, and a member separate from and fixed to said inner side of the body below said other means, said member being formed to provide a top surface that inclines downwardly from its upper end and to provide at its upper end, in connection with said inner side of the body, an upwardly opening recess.

ROBERT W. PASHBY.

REFERENCES CITED

The following references are of record in the file of this patent:

UNITED STATES PATENTS

| Number | Name | Date |
|--------|------|------|
| 119,666 | Stuart | Oct. 3, 1871 |
| 319,233 | Green | June 2, 1885 |
| 430,984 | Benvenisti | June 24, 1890 |
| 938,187 | Walker | Oct. 26, 1909 |
| 1,044,253 | Sampley | Nov. 12, 1912 |
| 1,151,672 | Donnelly | Aug. 31, 1915 |
| 1,437,171 | Currey | Nov. 28, 1922 |
| 1,497,738 | Roose | June 17, 1924 |
| 2,057,962 | Mailhoit | Oct. 20, 1936 |
| 2,169,125 | Preston | Aug. 8, 1939 |
| 2,211,030 | Rutenber | Aug. 13, 1940 |
| 2,212,065 | Fischer | Aug. 20, 1940 |
| 2,225,953 | Gough | Dec. 24, 1940 |
| 2,362,720 | Reichart | Nov. 14, 1944 |

FOREIGN PATENTS

| Number | Country | Date |
|--------|---------|------|
| 24,667 | Great Britain | Nov. 17, 1908 |
| 401,107 | Great Britain | Nov. 9, 1933 |